United States Patent
Hallek et al.

(10) Patent No.: US 10,310,083 B2
(45) Date of Patent: Jun. 4, 2019

(54) METHOD FOR DETECTING TARGET ECHOES IN A RECEIVED SIGNAL OF AN ULTRASONIC SENSOR OF A MOTOR VEHICLE, ULTRASONIC SENSOR DEVICE, AND MOTOR VEHICLE

(71) Applicant: VALEO Schalter und Sensoren GmbH, Bietigheim-Bissingen (DE)

(72) Inventors: Michael Hallek, Bietigheim-Bissingen (DE); Thomas Jung, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 441 days.

(21) Appl. No.: 15/106,962

(22) PCT Filed: Nov. 21, 2014

(86) PCT No.: PCT/EP2014/075229
§ 371 (c)(1),
(2) Date: Jun. 21, 2016

(87) PCT Pub. No.: WO2015/090842
PCT Pub. Date: Jun. 25, 2015

(65) Prior Publication Data
US 2017/0003391 A1  Jan. 5, 2017

(30) Foreign Application Priority Data
Dec. 21, 2013 (DE) .......... 10 2013 021 845

(51) Int. Cl.
*G01S 15/00* (2006.01)
*G01S 15/93* (2006.01)
(Continued)

(52) U.S. Cl.
CPC ............ *G01S 15/931* (2013.01); *G01S 7/023* (2013.01); *G01S 7/527* (2013.01); *G01S 15/104* (2013.01);
(Continued)

(58) Field of Classification Search
USPC .......................................... 367/97
See application file for complete search history.

(56) References Cited

U.S. PATENT DOCUMENTS 6,091,522 A * 7/2000 Snawerdt, III .......... G01S 7/285
398/1
6,201,496 B1 * 3/2001 Lee .......................... G01S 13/72
342/133
(Continued)

FOREIGN PATENT DOCUMENTS

CN 102741704 A 10/2012
CN 103154768 A 6/2013
(Continued)

OTHER PUBLICATIONS

International Search Report issued in PCT/EP2014/075229 dated Mar. 23, 2015 (2 pages).
(Continued)

*Primary Examiner* — James R Hulka
(74) *Attorney, Agent, or Firm* — Osha Liang LLP (57) ABSTRACT

The invention relates to a method for detecting target echoes (11) in a reception signal (ES) of an ultrasonic sensor of a motor vehicle by providing a reference signal (RS) for decoding the reception signal (ES), wherein with respect to a multiplicity of predetermined frequency shift values in each case a correlation input signal (RS) is provided by shifting the reference signal (RS) in terms of its frequency by the respective frequency shift value; correlating the reception signal (ES) separately with each of the correlation
(Continued)

input signals (RS) and thereby providing respective correlation output signals (KS1 to KS7), as the result of the respective correlation; and by providing a summation signal (SS) as the sum of the correlation output signals (KS1 to KS7), wherein on the basis of the summation signal (SS) one of the correlation output signals (KS1 to KS7) is selected and detecting the target echoes (11) is carried out by evaluating the selected correlation output signal (KS1 to KS7).

12 Claims, 5 Drawing Sheets

(51) Int. Cl.
*G01S 7/02* (2006.01)
*G01S 7/527* (2006.01)
*G01S 15/10* (2006.01)
*G01S 15/32* (2006.01)
*G01S 15/87* (2006.01)

(52) U.S. Cl.
CPC .......... *G01S 15/325* (2013.01); *G01S 15/876* (2013.01); *G01S 2015/932* (2013.01)

(56) References Cited

U.S. PATENT DOCUMENTS

| | | | | |
|---|---|---|---|---|
| 7,027,356 | B2* | 4/2006 | Bahr | G01S 7/521 367/87 |
| 8,660,668 | B2* | 2/2014 | Bardy | A61N 1/05 439/909 |
| 8,982,668 | B2* | 3/2015 | Horsky | G01S 7/536 367/100 |
| 2004/0218471 | A1 | 11/2004 | Bahr et al. | |
| 2008/0012757 | A1* | 1/2008 | Stagliano | G01S 7/282 342/26 R |
| 2012/0120768 | A1 | 5/2012 | Horsky et al. | |
| 2013/0030511 | A1 | 1/2013 | Bardy et al. | |

FOREIGN PATENT DOCUMENTS

| | | | | |
|---|---|---|---|---|
| DE | 37 01 521 A1 | 8/1988 | | |
| DE | 197 36 552 A1 | 3/1999 | | |
| DE | 101 06 142 A1 | 8/2002 | | |
| DE | 10 2008 040 248 A1 | 1/2010 | | |
| DE | 10-2011-109915 | * | 2/2013 | G01S 15/10 |
| DE | 10 2011 109915 A1 | 2/2013 | | |
| EP | 1 105 749 B1 | 5/2002 | | |
| EP | 1231481 A2 | 8/2002 | | |
| EP | 2 144 069 A2 | 1/2010 | | |
| EP | 2144069 A2 | * | 1/2010 | G01P 3/366 |
| JP | 2000-111646 A | 4/2000 | | |
| JP | 2012-108121 A | 6/2012 | | |

OTHER PUBLICATIONS

Written Opinion of the International Searching Authority issued in PCT/EP2014/075229 dated Mar. 23, 2015 (9 pages).
German Search Report issued in DE 10 2013 021 845.4 dated Mar. 19, 2014 (5 pages).
Notification of Reason for Rejection issued in corresponding Japanese Patent Application No. 2016-541681, dated Jul. 7, 2017 (5 pages).
The First Office Action issued in corresponding Chinese Patent Application No. 2014800738112, dated Jun. 4, 2018 (13 pages).

* cited by examiner

METHOD FOR DETECTING TARGET ECHOES IN A RECEIVED SIGNAL OF AN ULTRASONIC SENSOR OF A MOTOR VEHICLE, ULTRASONIC SENSOR DEVICE, AND MOTOR VEHICLE

The invention relates to a method for detecting target echoes in a reception signal of an ultrasonic sensor of a motor vehicle. A reference signal for decoding the reception signal is provided. With respect to a multiplicity of predetermined frequency shift values, in each case a correlation input signal is then provided by shifting the reference signal in terms of its frequency by the respective frequency shift value. The reception signal is correlated separately with each of the correlation input signals, such that respective correlation output signals are provided as the result of the respective correlation. A summation signal is provided from the correlation output signals. The invention additionally relates to an ultrasonic sensor device for carrying out such a method and to a motor vehicle comprising such an ultrasonic sensor device.

Ultrasonic sensors for motor vehicles are already known in diverse configurations from the prior art. They are usually used for supporting the driver when manoeuvring the motor vehicle, in particular when carrying out parking operations. In this case, the ultrasonic sensors are used to measure distances to obstacles situated in the surroundings of the motor vehicle. The ultrasonic sensors here belong to a driver assistance device, referred to as a parking aid. However, nowadays ultrasonic sensors are also being used more and more often outside this actual parking aid functionality, such as, for example, for driving support with active braking interventions, i.e. in automatic braking assistance systems, in blind spot monitoring systems, in autonomous cruise control systems, in collision detection systems and the like.

Ultrasonic sensors operate according to the echo propagation time principle: in ultrasonic technology the measurement of distance is carried out by means of an echo propagation time method or echo sounding method. The ultrasonic sensor transmits a transmission signal—ultrasound—and receives a reception signal, which is likewise a sound signal and corresponds to a signal component of the transmission signal that was transmitted and reflected at an obstacle. In other words, ultrasonic waves are transmitted, reflected from an object and received again by the same ultrasonic sensor and/or an adjacent ultrasonic sensor of the same motor vehicle and are evaluated. Depending on the measured propagation time of the ultrasonic wave, the distance and if appropriate also the relative position and/or a relative speed relative to the motor vehicle are then determined.

The prior art additionally includes modulating or coding the transmission signal of an ultrasonic sensor, such that a predetermined, specific code word is impressed on the transmission signal and this specific code word or an identifier is thus transmitted with the transmission signal. The transmission signal can then be differentiated from other interference signals or from sound signals of other sensors of the own motor vehicle and also from sound signals of other motor vehicles. On the one hand, the reception signal can thus be differentiated from ultrasonic signals of other vehicles; on the other hand, simultaneous operation of a plurality of ultrasonic sensors of one and the same motor vehicle is thus made possible as well. In this case, each ultrasonic sensor transmits a transmission signal with an assigned specific identifier and can then recognise again the own sound signal or else the signal of an adjacent sensor.

A method for simultaneously operating a plurality of ultrasonic sensors is known for example from the document DE 101 06 142 A1. From the document EP 1 105 749 B1, too, it is known that the transmission signals of different ultrasonic sensors can be provided with a dedicated identifier and thus differentiated from one another. The coding of a sound signal of an ultrasonic sensor is furthermore known from the document DE 37 01 521 A1.

If the transmission signal is coded and a specific identifier or a code word is impressed on the transmission signal in this case, then it is also necessary to check whether the received reception signal has the same identifier and is thus the transmission signal reflected from an object or can be assigned to one and the same ultrasonic sensor. According to the present-day prior art, the received signals are checked with regard to their coding by means of correlation. The decoding of the reception signal is thus manifested such that said reception signal is correlated with a reference signal, wherein the result of the correlation is a measure of the correspondence between the received ultrasonic signal and the expected signal. The reference signal used is usually the emitted transmission signal or a signal which corresponds to the transmission signal. If a relatively high correlation between the reception signal and the reference signal is identified, then it is established that the reception signal is the own signal of the ultrasonic sensor or the reception signal contains the same code as the transmission signal.

However, the determination of the origin of the reception signal or the decoding of the reception signal is not always possible with high accuracy on the basis of a simple correlation. This is because the vehicle-external object is often moving relative to the motor vehicle and the relative velocity between the motor vehicle and the object causes a frequency shift in the ultrasonic signal on account of the Doppler effect. Therefore, the prior art often also uses for the correlation a reference signal which does not correspond exactly to the emitted transmission signal, but rather to a frequency-shifted transmission signal. It is thus attempted to compensate for the Doppler shift of the reception signal. Such a method is known from the document DE 10 2011 109 915 A1.

The invention proceeds from a method in which, for decoding the modulated or coded reception signal, the reference signal—the latter usually corresponds to the transmission signal—is shifted in terms of its frequency separately by a plurality of frequency shift values. This gives rise to a plurality of correlation input signals, with which the reception signal is correlated separately. As a result of this correlation, respective correlation output signals are provided, from which a summation signal is then formed, in which target echoes are sought. Thus, use is made of a filter bank adapted to the different object velocities with a plurality of Doppler gates in the reception path, as is described for example in the document DE 101 06 142 A1. The "Doppler gates" are also known by the designation "Doppler bins". In this case it is necessary to keep available a correlation input signal (the frequency-shifted reference signal) for any possible relative velocity between vehicle and target object, namely both for positive and for negative relative velocities. This method proves to be sufficient in the case of simple scenarios with only one target object, but encounters its limits in scenarios in which a plurality of target objects situated very close to one another or else objects having a plurality of reflection points are situated in the surroundings of the motor vehicle. This is because in such scenarios relatively small objects (objects having a relatively low correlator amplitude) disappear in the general correlation noise. Specifically, the correlation result contains a relatively high intrinsic noise that significantly reduces the signal-to-noise ratio. In the summation signal, target echoes which originate from relatively small target objects can thus disappear in the correlation noise. In order to achieve a better resolution when detecting the target echoes, each correlation output signal would have to be evaluated separately. However, transmitting the evaluation results of all the correlation output signals would lead to an untenable increase in the bus load between ultrasonic sensor and control unit.

It is an object of the invention to demonstrate a solution as to how, in a method of the generic type mentioned in the introduction, the spatial resolution when detecting the target objects can be improved in comparison with the prior art.

This object is achieved according to the invention by means of a method, by means of an ultrasonic sensor device and also by means of a motor vehicle having the features according to the respective independent patent claims. Advantageous embodiments of the invention are the subject of the dependent patent claims, the description and the figures.

In a method according to the invention, target echoes are detected in a reception signal of an ultrasonic sensor of a motor vehicle. The reception signal is a signal component of a transmission signal which is transmitted by the ultrasonic sensor or another ultrasonic sensor of the same motor vehicle and is reflected in the surroundings of the motor vehicle. The transmission signal is transmitted in a coded fashion, such that a predetermined code word is impressed on the transmission signal. Correspondingly, the reception signal also contains a code word and must therefore be demodulated again. By way of example, a frequency modulation and/or phase modulation can be used. A reference signal corresponding to the transmitted transmission signal, for example, is provided for decoding the reception signal. With respect to a multiplicity of predetermined frequency shift values (for a multiplicity of possible relative velocities) in each case a correlation input signal is provided by shifting the reference signal in terms of its frequency by the respective frequency shift value. The frequency shift values can also comprise the zero value. The reception signal is then correlated separately with each correlation input signal and respective correlation output signals are thereby provided as the result of the respective correlation. A summation signal is formed from the correlation output signals. According to the invention it is provided that on the basis of the summation signal one of the correlation output signals is selected and detecting the target echoes is carried out by evaluating the selected correlation output signal, in particular solely the selected correlation output signal.

In order to improve the spatial resolution it is accordingly proposed to use the summation signal of the correlation output signals for selecting one of the correlation output signals or a specific Doppler bin. In this case, the invention is based on the insight that target echoes attributable to small target objects may indeed disappear in the correlation noise from target echoes of larger objects, but without the larger target objects being visible and thus detectable. On the basis of the summation signal, therefore, the associated Doppler gate is subsequently selected and the selected correlation output signal is evaluated for detecting the target echoes. In the selected correlation output signal it is now also possible to detect target echoes of relatively small target objects which could not be detected on the basis of the summation signal on account of the higher correlation noise.

With the method according to the invention it is thus possible to detect even relatively small target objects which are situated very close to a relatively large target object.

The method is preferably carried out by means of an evaluation device that is part of the ultrasonic sensor itself. This means that the evaluation device is integrated into a sensor housing of the ultrasonic sensor. The result of the detection of the target echoes is then communicated from the ultrasonic sensor to a control unit of the motor vehicle.

In one embodiment, the selection of one of the correlation output signals is manifested as follows: a maximum of the summation signal can be detected. That correlation output signal to which the detected maximum belongs is then selected for detecting the target echoes. In other words, that correlation output signal which belongs to the highest amplitude in the summation signal is selected. In this way it can always be ensured that the largest target echo and thus the target object having the highest reflectivity and furthermore also smaller target echoes situated in the region of the largest target echo can be detected.

Preferably, the summation signal is subdivided into a multiplicity of signal sections. The selection of one of the correlation output signals can be carried out separately with respect to each signal section. In this case, each signal section is respectively assigned a temporally corresponding section of the respectively selected correlation output signal. Detecting the target echoes is then carried out by evaluating the corresponding sections of the selected correlation output signals. In other words, the summation signal in the time domain is subdivided into a plurality of time intervals, wherein the selection of one of the correlation output signals is carried out separately for each time interval, such that the summation signal in the respective time interval is replaced as it were by the selected correlation output signal and in this time interval detecting the target echoes is carried out by evaluating the corresponding section of the selected correlation output signal. Consequently, an evaluation signal is formed from sections of different correlation output signals, on the basis of which evaluation signal target echoes situated at different distances from the motor vehicle can then be detected.

With respect to each signal section of the summation signal preferably a respective local maximum is detected. In each case that correlation output signal to which the respective local maximum belongs is then selected. For each distance it is thus possible to detect in each case the target echo having the highest amplitude and also the adjacent target echoes which could not be detected in the summation signal on account of the high correlation noise.

Subdividing the summation signal into a plurality of signal sections is preferably carried out depending on a temporal profile of the summation signal itself. The subdivision is thus carried out in a situation-dependent manner or depending on the current surroundings scenario and thus depending on the amplitude profile of the summation signal. The detection of the target echoes can thus be adapted even better to the current scenario, and a new correlation output signal can be selected at the correct point in time.

In this case, it is preferably provided that when subdividing the summation signal this signal is compared with a threshold value function and, in the event of the threshold value function being exceeded, the beginning of a new signal section of a predefined time duration is defined. A point in time at which a possible target echo is detected is thus defined as the beginning of a new signal section. A time duration which characterises the length of the new signal section of the summation signal is defined starting from this point in time. Consequently, the selection of one of the correlation output signals takes into account all possible target echoes which are situated in the region of the first detected echo which was detected in the event of the threshold value function being exceeded. It is thus possible to detect all relevant target echoes which are situated in a specific distance range from the motor vehicle.

Only after the predefined time duration has elapsed is the summation signal compared then with the threshold value function again for defining a further signal section. In other words, it is only after the predefined time duration has elapsed that, for defining a new signal section, a check is again made to determine whether the summation signal exceeds the threshold value function. If the threshold value function is then exceeded, the beginning of a new signal section which has the predefined time duration mentioned above is defined. This method is carried out repeatedly, such that in each case after the predefined time duration has elapsed, the summation signal is compared again with the threshold value function for defining a further signal section. It can thus be ensured that all target echoes can also be reliably detected.

It has proved to be advantageous if an envelope curve provided by low-pass filtering of the summation signal is defined as the threshold value function. The threshold value function, too, is thus defined depending on the temporal profile of the summation signal itself and is hence adapted to the respective scenario. As a result, it is possible to detect all signal spikes of the summation signal which may represent a possible target echo.

If one of the correlation output signals is selected for the respective signal section of the summation signal, then evaluating the selected correlation output signal for detecting the target echoes is preferably carried out in such a way that signal values of the selected correlation output signals are compared with a detection threshold value curve. Those signal components of the correlation output signal which exceed the detection threshold value curve are interpreted and indicated as target echoes.

The invention additionally relates to an ultrasonic sensor device for a motor vehicle, comprising a receiving unit—in particular comprising a membrane and a piezoelement—for receiving a sound signal and for providing an electrical reception signal depending on the received sound signal, and comprising an evaluation device for detecting target echoes in the reception signal. The evaluation device is designed for carrying out a method according to the invention.

The ultrasonic sensor device preferably comprises an ultrasonic sensor having a sensor housing, in which the evaluation device is arranged. The detected target echoes are preferably communicated from the evaluation device to a control unit of the ultrasonic sensor device.

A motor vehicle according to the invention, in particular a car, comprises an ultrasonic sensor device according to the invention.

The preferred embodiments presented with regard to the method according to the invention and their advantages are correspondingly applicable to the ultrasonic sensor device according to the invention and also to the motor vehicle according to the invention.

Further features of the invention are evident from the claims, the figures and the description of the figures. All features and feature combinations mentioned above in the description and the features and feature combinations mentioned below in the description of the figures and/or shown in the figures alone are usable not only in the combination respectively indicated but also in other combinations or else by themselves.

The invention will now be explained in greater detail on the basis of one preferred exemplary embodiment and with reference to the accompanying drawings.

Figure 1:
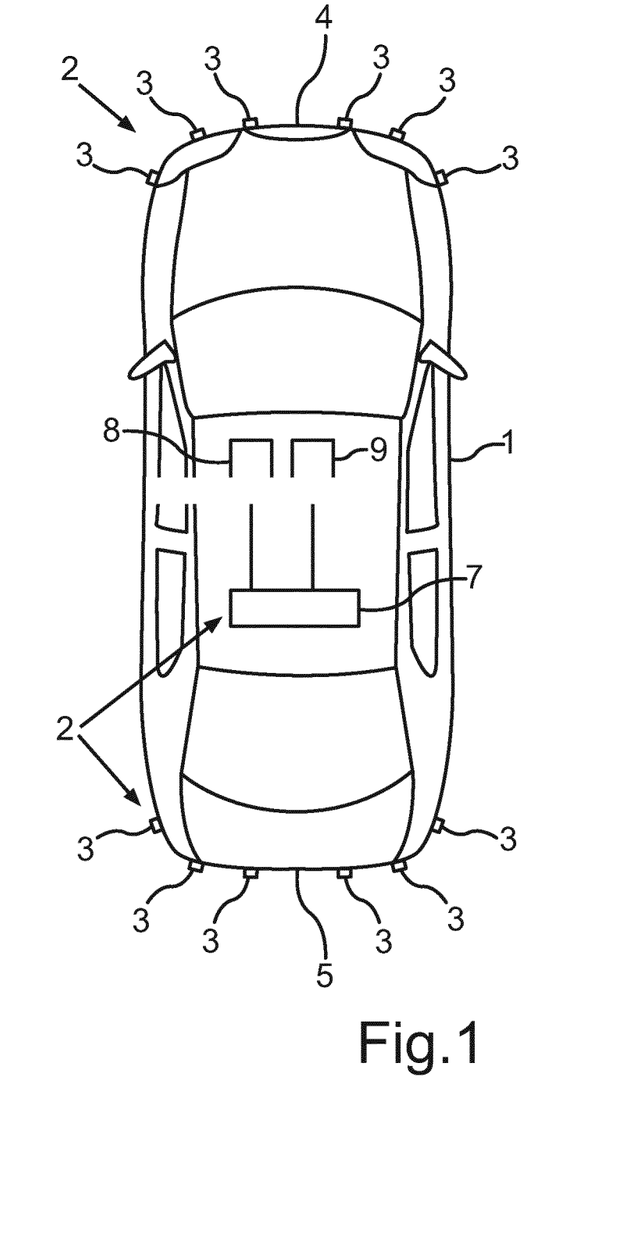
FIG. 1 shows in schematic illustration a motor vehicle comprising an ultrasonic sensor device in accordance with one embodiment of the invention.

A motor vehicle 1 illustrated in FIG. 1 is a car, for example. The motor vehicle 1 comprises an ultrasonic sensor device 2, which is for example a parking aid or a parking assistance system. The ultrasonic sensor device 2 serves for supporting the driver of the motor vehicle 1 when carrying out parking processes. For this purpose, it comprises a multiplicity of ultrasonic sensors 3 arranged in a manner distributed both at the front fender 4 and at the rear fender 5. All the ultrasonic sensors 3 are electrically coupled to a control unit 7 of the ultrasonic sensor device 2. The control unit 7 may contain for example a digital signal processor and/or a microcontroller and serves for driving the ultrasonic sensors 3. The control unit 7 also receives measurement data from the ultrasonic sensors 3 and, depending on these measurement data, determines the distances between the motor vehicle 1 and obstacles situated in its surroundings. Depending on these distances, the control unit 7 can drive for example a loudspeaker 8 and/or an optical display device 9—for example a display. Owing to the loudspeaker 8 and/or the display device 9, the driver is informed of the measured distances.

If appropriate, the ultrasonic sensor device 2 may also be an automatic or semi-automatic parking assistance system by means of which a parking gap is automatically detected and a suitable parking trajectory is automatically calculated, along which the motor vehicle 1 can then be guided into the parking gap automatically or semi-autonomously. In the case of fully automatic parking assistance systems, the ultrasonic sensor device 2 performs both the longitudinal guidance and the transverse guidance of the motor vehicle 1, while in semi-automatic or semi-autonomous systems the driver assistance device 2 automatically performs only the transverse guidance and thus the steering, while the driver himself/herself has to operate the accelerator pedal and brake. There are also known systems in which the driver himself/herself has to perform both the longitudinal guidance and the transverse guidance, but indications regarding the steering are output by the ultrasonic sensor device 2.

The control unit 7 can drive the ultrasonic sensors 3 in such a way that the ultrasonic sensors 3 in each case transmit a transmission signal (ultrasound) with an impressed, specific and predetermined code. For this purpose, the transmission signals are modulated, for example frequency-modulated and/or phase-modulated. A method in accordance with one embodiment is explained in greater detail below.

Even though the following description relates to an individual ultrasonic sensor 3, all other sensors 3 can also be operated in the same way.

An ultrasonic sensor 3 transmits a transmission signal which is modulated in a specific way and thus contains a specific code word as identifier. This transmission signal is then reflected from an obstacle and passes again to the ultrasonic sensor 3 as reception signal. The ultrasonic sensor 3 receives this reception signal.

Figure 2:
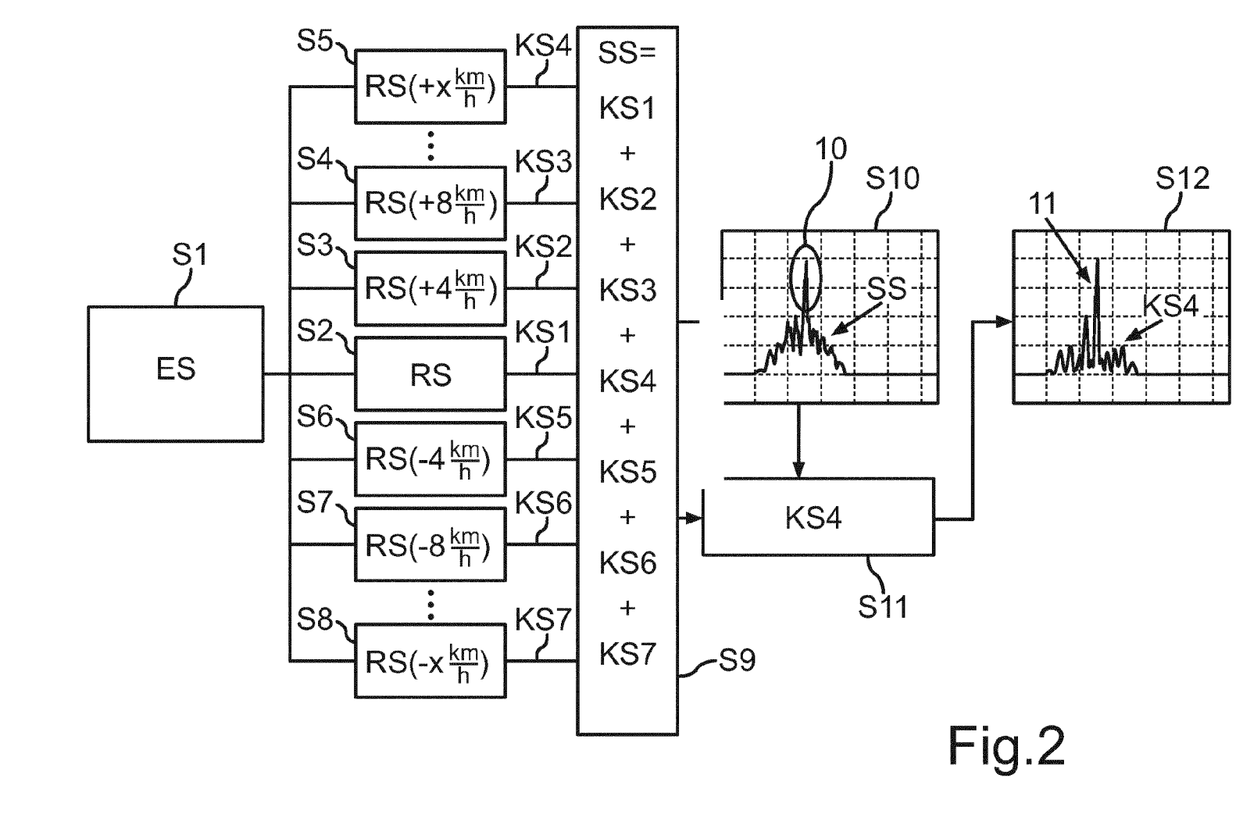
FIG. 2 shows a flow diagram for elucidating a method in accordance with one embodiment of the invention.

The decoding of the reception signal will now be explained in greater detail with reference to FIG. 2. In accordance with step S1, with respect to the received sound signal an electrical reception signal ES is provided by means of a piezoelement and is then converted to a digital reception signal ES with the aid of a corresponding analogue-to-digital converter in the ultrasonic sensor 3. The subsequent signal processing is then carried out by means of an evaluation device of the ultrasonic sensor 3 on the basis of the digital reception signal ES. In accordance with step S1, therefore, a modulated or coded and digital reception signal ES is present. In accordance with step S2, a reference signal RS is provided which corresponds to the transmitted transmission signal. From this reference signal RS a multiplicity of correlation input signals are provided: RS, RS(+4 km/h), RS(+8 km/h), RS(+x km/h), RS(−4 km/h), RS(−8 km/h) and RS(−x km/h). In other words, the reference signal RS is frequency-shifted by a multiplicity of different frequency shift values, wherein the frequency shift values in the exemplary embodiment are both negative and positive values. A spacing between the adjacent frequency shift values which corresponds to a relative velocity of 4 km/h is chosen in the exemplary embodiment.

In accordance with step S2, the reception signal ES is correlated with the reference signal RS. This non-frequency-shifted reference signal RS is also a correlation input signal within the meaning of the invention, which is formed by a frequency shift of the reference signal RS by the zero value. A correlation output signal KS1 is provided as a result of this correlation.

In accordance with step S3, the reception signal ES is correlated with the correlation input signal RS(+4 km/h). A correlation output signal KS2 is provided as the result of this correlation.

In accordance with step S4, the reception signal ES is correlated with the correlation input signal RS(+8 km/h), wherein a correlation output signal KS3 is formed as the correlation result.

In accordance with step S5, a correlation output signal KS4 is provided as a result of a correlation of the reception signal ES with the correlation input signal RS(+x km/h).

In accordance with step S6, the reception signal ES is also correlated with the correlation input signal RS(−4 km/h)—a correlation output signal KS5 is provided here.

In accordance with step S7, the reception signal ES is correlated with the correlation input signal RS(−8 km/h). A correlation output signal KS6 is provided.

Finally, in accordance with step S8, the reception signal ES is also correlated with the correlation input signal RS(−x km/h) in order to provide a correlation output signal KS7.

In accordance with step S9, a summation signal SS is provided from the correlation output signals KS1 to KS7 of all the Doppler bins: SS=KS1+KS2+KS3+ . . . +KS7.

The evaluation device of the ultrasonic sensor 3 then analyses the summation signal SS in accordance with step S10 and selects one of the correlation output signals (here KS4 for example) depending on this analysis in accordance with step S11. In this case, the evaluation device searches for a maximum 10 in the summation signal SS and selects that correlation output signal KS4 to which the maximum 10 belongs. In accordance with step S12, target echoes 11 are detected in the selected correlation output signal KS4.

Figure 3:
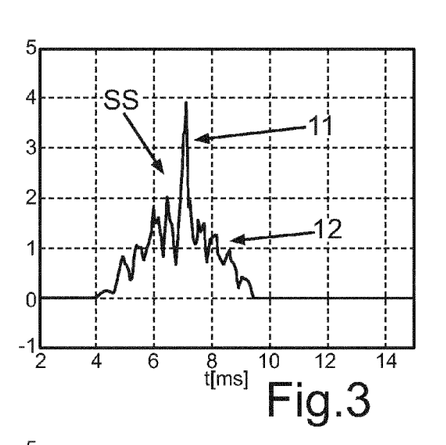
FIGS. 3 to 6 show an exemplary summation signal and exemplary correlation output signals.

An exemplary summation signal SS is shown in greater detail here in FIG. 3. In this case, the illustration shows the amplitude of the summation signal SS against time t. As is evident from FIG. 3, the summation signal SS contains one signal spike or one signal echo 11, which is significantly greater than a correlation noise 12. Further target echoes cannot be detected here.

Figure 4:
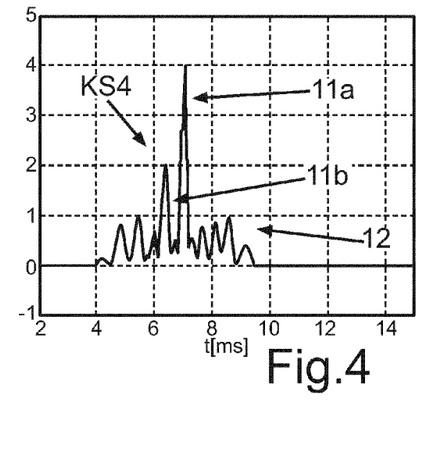
Figure 5:
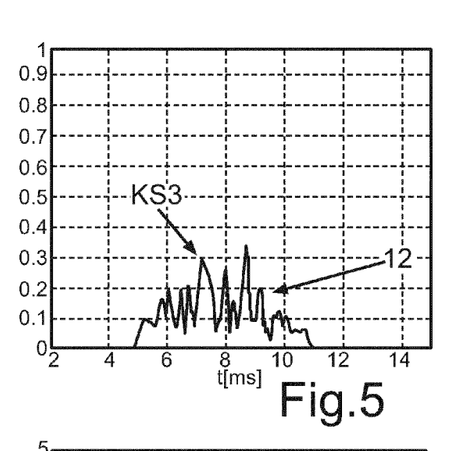
Figure 6:
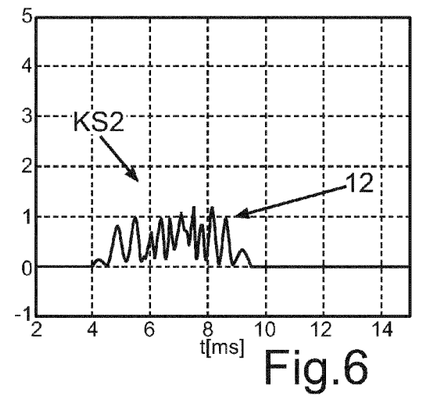

By contrast, FIGS. 4 to 6 illustrate individual correlation output signals, here KS4, KS3 and KS2, respectively. As is evident in particular from FIG. 4, a total of two target echoes 11a, 11b can be detected on the basis of the correlation output signal KS4, wherein the first target echo 11a corresponds to the target echo 11 in accordance with FIG. 3. On the basis of the correlation output signal KS4, it is possible in addition also to detect the second target echo 11b, which disappears in the correlation noise 12 in the summation signal SS. The correlation output signals KS3 and KS2 illustrated respectively in FIGS. 5 and 6 contain only the correlation noise 12.

If the correlation output signal KS4 in accordance with FIG. 4 is selected on the basis of the summation signal SS in accordance with FIG. 3, then it is possible to detect overall more target echoes 11a, 11b than in the summation signal SS. The spatial resolution of the ultrasonic sensor device 2 is thus improved.

Figure 7:
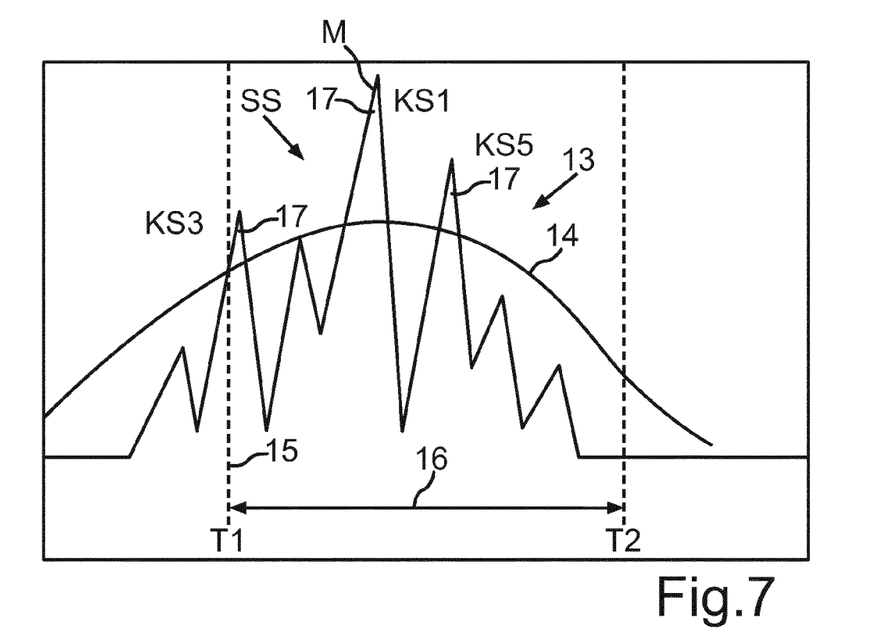
FIG. 7 shows an exemplary signal section of a summation signal.

The selection of one of the correlation output signals KS1 to KS7 is carried out separately for different signal sections of the summation signal SS. The determination of the signal sections is explained in greater detail below with reference to FIGS. 7 to 10. In this case, FIG. 7 illustrates an individual signal section 13 of an exemplary summation signal SS. In order to subdivide the summation signal SS into a plurality of signal sections, a threshold value function 14 is provided which constitutes an envelope curve and is formed by low-pass filtering of the summation signal SS. The summation signal SS is compared with the threshold value function 14. If the summation signal SS exceeds the threshold value function 14 at a point in time T1, then the beginning 15 of a new signal section 13 is defined at the point in time T1. The signal section 13 has a predefined time duration 16 and thus ends at a point in time T2. The evaluation device then compares all signal spikes 17 which are greater than the threshold value function 14. The largest signal spike 17 corresponds to a local maximum M. The information regarding to which correlation output signal KS1 to KS7 the respective signal spike 17 belongs is additionally present with respect to each signal spike 17. As is evident from FIG. 7, the signal spikes 17 belong for example to the correlation output signals KS1, KS5 and KS3.

Figure 8:
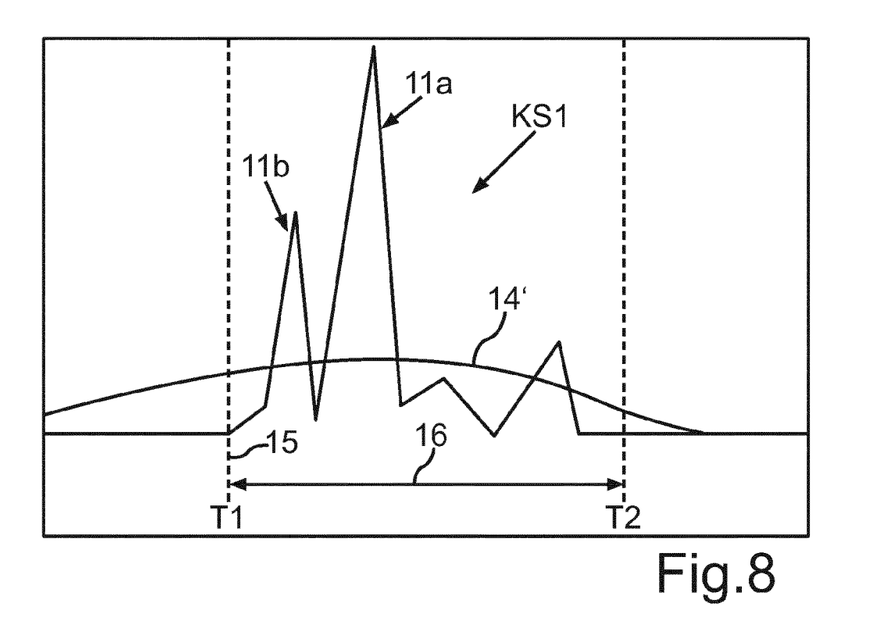
FIG. 8 shows an exemplary signal section of a correlation output signal temporally assigned to the signal section in accordance with FIG. 7.

Since the maximum M belongs to the correlation output signal KS1, for detecting target echoes 11 within the time duration 16 use is made of the temporally corresponding section of the correlation output signal KS1, which is illustrated in greater detail in FIG. 8. As is evident from FIG. 8, the correlation output signal KS1 contains two potential target echoes 11a, 11b. The second target echo 11b could not be detected on the basis of the summation signal SS alone. FIG. 8 additionally shows a corresponding envelope curve 14' formed by low-pass filtering of the correlation output signal KS1. Said envelope curve 14' is significantly smaller than the threshold value function 14 in accordance with FIG. 7. This is because the correlation noise 12 of the individual correlation output signal KS1 is significantly less than the correlation noise 12 of the summation signal SS, such that a plurality of target echoes 11a, 11b can also be detected in the correlation output signal KS1.

Figure 9:
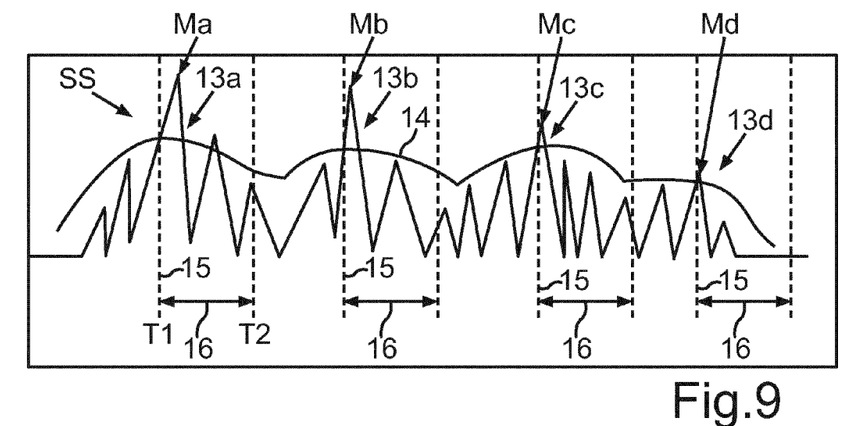
FIGS. 9 and 10 show an exemplary summation signal and an exemplary evaluation signal formed by signal sections of different correlation output signals.

After the time duration 16 has elapsed, the beginning 15 of a further, new signal section 13 of the summation signal SS is then sought again. As is evident from FIG. 9, after the first signal section 13a has elapsed, the amplitude of the summation signal SS is compared again with the threshold value function 14. If the summation signal SS exceeds the threshold value function 14, the beginning 15 of a new signal section 13b of the same time duration 16 is defined. After this time duration 16 has elapsed, the summation signal SS is compared again with the threshold value function 14, and, in the event of the threshold value function 14 being exceeded, the beginning 15 of a further signal section 13c is defined, which likewise has the same time duration 16. FIG. 9 furthermore shows a signal section 13d that is detected after the signal section 13c. While the time duration 16 of each signal section 13a to 13d remains constant, the temporal spacings between the respective signal sections 13a to 13d change.

With respect to each signal section 13a to 13d in each case one of the correlation output signals KS1 to KS7 is selected separately, specifically in each case that correlation output signal KS1 to KS7 which has the local maximum Ma to Md within the respective signal section 13a to 13d. In accordance with FIG. 10, an evaluation signal AS consisting of signal sections of different correlation output signals KS1 to KS7 is formed overall. For the signal section 13a of the summation signal SS, for example, the temporally corresponding section of the correlation output signal KS1 is selected since the local maximum Ma belongs to said correlation output signal KS1. For the signal section 13b, for example, the corresponding section of the correlation output signal KS3 is selected since the local maximum Mb belongs to said correlation output signal KS3. The signal section 13c of the summation signal SS is replaced by the temporally assigned section of the correlation output signal KS6 since the local maximum Mc belongs to the correlation output signal KS6. Finally, in the exemplary embodiment, the signal section 13d of the summation signal SS is replaced by the corresponding section of the correlation output signal KS4, since the local maximum Md belongs to said correlation output signal KS4.

Figure 10:
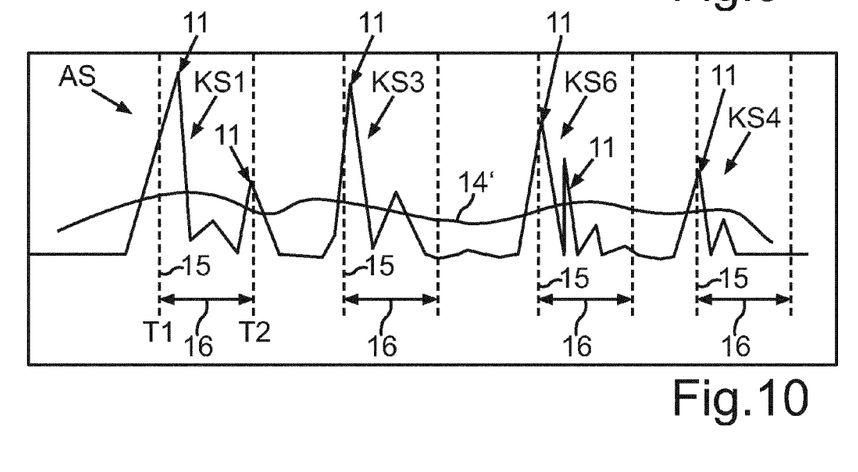

Detecting the target echoes 11 is then carried out by evaluating the evaluation signal AS. In this case, a detection threshold value curve (not illustrated in FIG. 10) is defined, with which the amplitude of the evaluation signal AS is compared. The potential target echoes 11 illustrated in FIG. 10 are indicated as actual target echoes only if they are greater than the detection threshold value curve mentioned. By way of example, ground reflections and/or a trailer coupling are filtered out by means of said detection threshold value curve.

The invention claimed is:

1. A method for detecting target echoes in a reception signal of an ultrasonic sensor of a motor vehicle, comprising:
providing a reference signal for decoding the reception signal;
with respect to a multiplicity of predetermined frequency shift values, providing in each case a correlation input signal by shifting the reference signal in terms of its frequency by the respective frequency shift value to produce a plurality of frequency shifted input signals;
correlating the reception signal separately with each of the plurality of frequency shifted input signals and thereby providing respective correlation output signals, as the result of the respective correlation; and
providing, based on the plurality of frequency shifted input signals, a summation signal as the sum of the correlation output signals,
wherein on the basis of the summation signal one of the correlation output signals is selected and detecting the target echoes is carried out by evaluating the selected correlation output signal.

2. The method according to claim 1, wherein the summation signal is subdivided into a multiplicity of signal sections and the selection of one of the correlation output signals is carried out separately with respect to each signal section, wherein each signal section is respectively assigned a temporally corresponding section of the respectively selected correlation output signal.

3. The method according to claim 1, wherein a maximum of the summation signal is detected and that correlation output signal to which the detected maximum belongs is selected for detecting the target echoes.

4. The method according to claim 3, wherein with respect to each signal section of the summation signal a respective local maximum is detected and in each case that correlation output signal is selected to which the respective local maximum belongs.

5. The method according to claim 3, wherein subdividing the summation signal is carried out depending on a temporal profile of the summation signal.

6. The method according to claim 5, wherein subdividing the summation signal comprises comparing the summation signal with a threshold value function and, in the event of the threshold value function being exceeded, defining the beginning of a new signal section of a predefined time duration.

7. The method according to claim 6, wherein only after the predefined time duration has elapsed is the summation signal compared with the threshold value function again for defining a further signal section.

8. The method according to claim 5, wherein an envelope curve provided by low-pass filtering of the summation signal is defined as the threshold value function.

9. The method according to claim 1, wherein evaluating the selected correlation output signal for detecting the target echoes comprises comparing signal values of the selected correlation output signal with a detection threshold value curve.

10. An ultrasonic sensor device for a motor vehicle, comprising:
a receiving unit for receiving a sound signal and for providing an electrical reception signal depending on the received sound signal; and
an evaluation device for detecting target echoes in the reception signal, wherein the evaluation device is configured to:
provide a reference signal for decoding the reception signal,
with respect to a multiplicity of predetermined frequency shift values, provide in each case a correlation input signal by shifting the reference signal in terms of its frequency by the respective frequency shift value to produce a plurality of frequency shifted input signals,
correlate the reception signal separately with each of the plurality of frequency shifted input signals and thereby to provide respective correlation output signals, as the result of the respective correlation, provide, based on the plurality of frequency shifted input signals, a summation signal as the sum of the correlation output signals, and on the basis of the summation signal, select one of the correlation output signals and to detect the target echoes by evaluating the selected correlation output signal.

11. The ultrasonic sensor device according to claim 10, further comprising an ultrasonic sensor having a sensor housing, in which the evaluation device is arranged.

12. A motor vehicle comprising an ultrasonic sensor device according to claim 10.

* * * * *